Dec. 19, 1944.   F. L. HILL   2,365,552
MONO-BALL BEARING
Filed Nov. 9, 1942
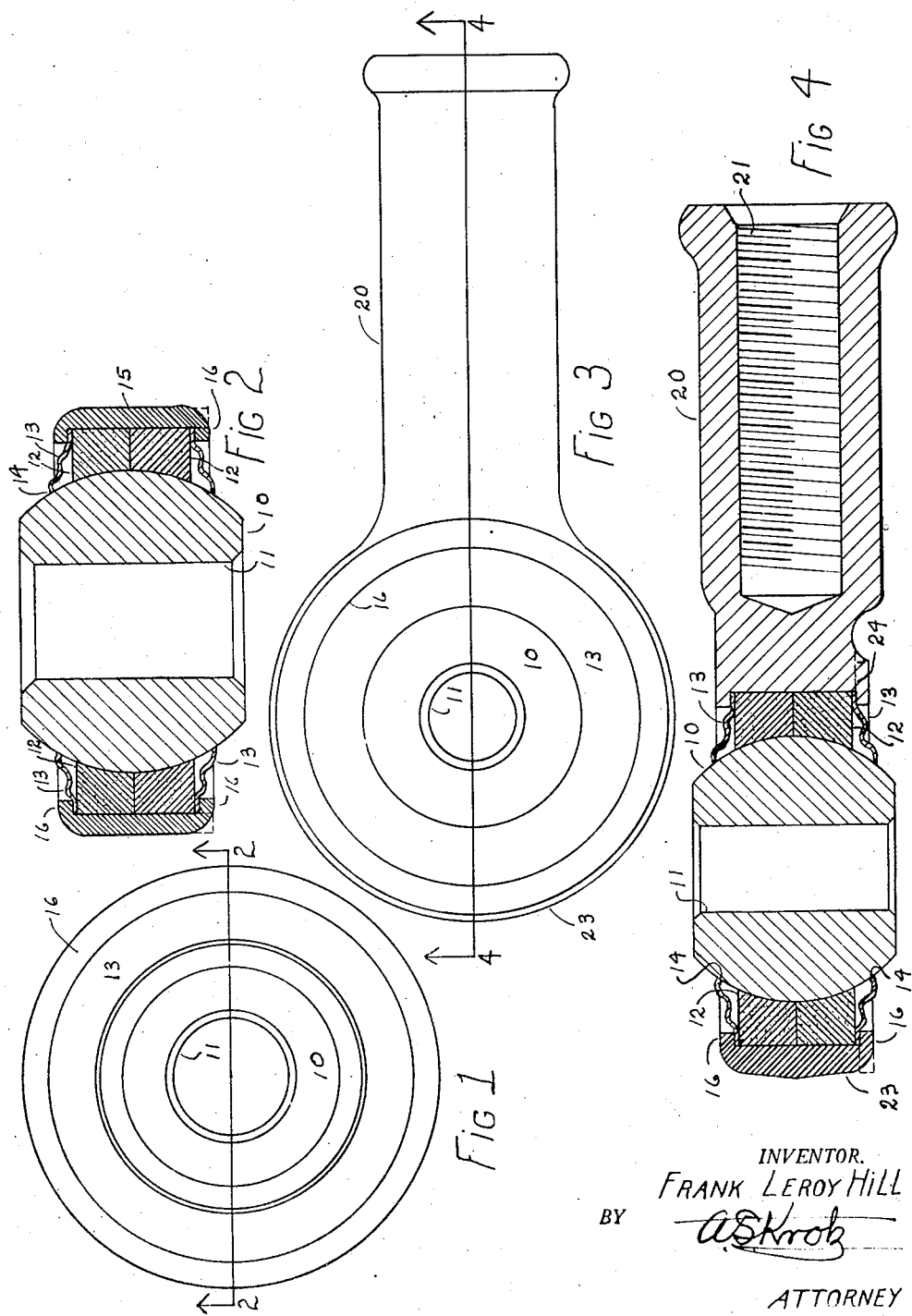
INVENTOR.
FRANK LEROY HILL
BY  A.S.Krotz
ATTORNEY Patented Dec. 19, 1944

2,365,552

UNITED STATES PATENT OFFICE 2,365,552

MONO-BALL BEARING

Frank Leroy Hill, Cherry Valley, Ill.

Application November 9, 1942, Serial No. 464,964

3 Claims. (Cl. 308—72)

The present invention relates to self-aligning bearings particularly for use on control rod ends and other applications on aircraft where the self-aligning feature is required and where frequent lubrication is impractical.

Generally stated, conventional bearings of the class are impractical largely because of excessive cost or because they are susceptible to damage from moisture, dust and dirt.

Generally stated, an object of my invention is to provide a design which retains lubrication and having substantially indestructible bearing surfaces and sealing means.

An important object of my invention is to provide a mono-ball bearing which is practically rust proof and adapted to serve in remote, inaccessible places without tension and without danger of seizing or getting out of order.

An object of my invention is to provide a design wherein the bearing may be manufactured with little machining and wherein the clearances may be held close enough so they are always free after assembling and will remain so indefinitely without objectionable wear and play.

To these and other useful ends, my invention consists of parts, combinations of parts, or their equivalents, and method of manufacture, as hereinafter set forth and claimed and shown in the accompanying drawing in which:

Fig. 1 is an end elevational view of one form of my improved bearing.

Fig. 2 is a section of my improved bearing taken on line 2—2 of Figure 1.

Fig. 3 is an end elevational view of my improved bearing shown on a controlling rod bracket for airplane use.

Fig. 4 is a sectional view taken on line 4—4 of Figure 3.

I provide a spherically shaped member 10 having a shaft opening 11. This member is preferably made of hardened steel and ground to size. I provide two races 12—12 which are preferably moulded from powdered metal, sintered and pressed to size. These members are adapted to retain lubricant.

I provide annularly corrugated spring metal washers 13—13, their openings 14 being adapted to hug member 10 when the washers and members 12 are assembled in their housing 15. The shape of washer 13 is about as shown so the outer edge lies between members 12 and flanges 16—16, one flange being formed after the assembly has been completed or by means of a separate annular ring as shown by dotted lines in Figure 4. This portion of the housing before being formed into the flange, is shaped as shown by dotted lines in Figure 2.

In the manufacture of members 12, the spherical surfaces of these members are adapted to snugly embrace members 10 when they are assembled into member 15 as already described.

Members 13 are preferably made from brass having spring characteristics so their edges 14 will not chafe the surface of member 10 and in view of the flexibility of the member, because of the corrugations, contact pressure will be firm but light so as to always prevent foreign matter from getting into the bearing.

Clearly if foreign matter cannot get into the bearing and if member 10 is hardened and ground to size and members 12 are made from pressed sponge material which does not have abrasive characteristics but will retain lubricating material, it can be said that my bearing is indestructible, self-aligning and especially suited for airplane use in inaccessible places thereon.

In manufacturing, bearing members 12 are preferably moulded from powdered metal, sintered and repressed to size, member 10 being ground to size so when members 12 are tightly held together by flanges 16, member 10 will be snugly held within the races but be free enough to permit necessary self-aligning movement. This feature is possible because the races are moulded or repressed on an arbor or core in which the surfaces are accurately formed into a high degree of uniformity and without machining.

In Figures 3 and 4 I illustrate my bearing adapted to be fitted to the end of a control shaft by means of a bracket 20 having a screw threaded opening 21 for the reception and adjustment of a control shaft, the shaft being preferably locked into the desired position by means of a lock nut. Bracket 20 is provided with an integral housing 23 for the reception of members 12 and 13 similar to that shown in Figure 2. Similar parts bear identical numerals to that shown in Figures 1 and 2. One of the flanges is preferably formed after the assembly has been completed similar to that shown in Figure 1.

In the design shown in Figures 1 and 2, housing 15 is machined for the reception of members 12 and 13 providing a flange 16 at one end only, the other end being shaped as shown by dotted lines. After the members 12 and 13 are pressed into position in the housing, the retaining flange is formed by machine rolling or pressing in a manner too well known to require further description.

In the design shown in Figures 3 and 4 I may elect to machine member 23 to a surface 24 indicated by dotted lines, and then supply an annular ring which may be detachably secured to member 23 after the assembling operation either by welding or otherwise.

It will be seen that the entire bearing comprises but six members, that when assembled, it is indestructible because lubricant retaining members 12 are protected against moisture, dust and dirt.

Clearly many minor detail changes may be made without departing from the spirit and scope of the present invention, as recited in the appended claims.

Having thus shown and described my invention, I claim:

1. A mono-ball bearing of the class described, comprising a generally spherically shaped member having an opening for the reception of a shaft, race members, their inner surfaces forming a spherically shaped opening adapted to rotatably embrace said spherical member when the races are held tightly together, washers positioned on opposite sides of said races and being shaped so that their openings snugly embrace said spherically shaped member a distance from said races, a bracket adapted to be secured to a control rod and having at its free end a housing adapted to snugly receive said races and washers, flanges on opposite sides of said housing adapted to tightly hold the races and washers therebetween.

2. A mono-ball bearing of the class described, comprising a generally spherically shaped member having an opening for the reception of a shaft, two metal race members moulded from powdered material and being sintered and repressed to size, their inner surfaces adapted to rotatably embrace said spherical member when the races are pressed tightly together, concentrically corrugated washers positioned on opposite sides of said races and being shaped so that their openings snugly embrace said spherical member a distance from the races, a bracket having a housing with an opening adapted to snugly receive said races and washers, said opening having overhanging flanges adapted to firmly hold the washers and races together.

3. A mono-ball bearing of the class described, comprising a generally spherically shaped member having an opening for the reception of a shaft, a pair of race members, their inner surfaces forming a spherically shaped opening which will rotatably embrace said spherical member when held tightly together, annular sealing members being annularly corrugated, a narrow portion of their outer edges lying parallel to and against the outer end surfaces of said races and being shaped so that their openings snugly embrace said spherical member a distance from said races, a housing having an opening for the snug reception of said races and sealing members and having narrow inwardly extending flanges adapted to snugly hold said races and narrow outer edges of the sealing members therebetween.

FRANK LEROY HILL.